United States Patent

[11] 3,633,094

| [72] | Inventor | Ralph E. Clements |
| | | Rockford, Ill. |
| [21] | Appl. No. | 28,620 |
| [22] | Filed | Apr. 15, 1970 |
| [45] | Patented | Jan. 4, 1972 |
| [73] | Assignee | Barber-Colman Company |
| | | Rockford, Ill. |

[54] BURST LENGTH PROPORTIONING CONTROLLER
9 Claims, 4 Drawing Figs.

[52] U.S. Cl. ............................................. 323/18,
307/252 UA, 323/19, 323/24, 323/38
[51] Int. Cl. ............................................. G05d 23/24
[50] Field of Search .................................. 307/133,
252 UA; 323/18, 19, 20, 22 SC, 24, 38

[56] References Cited
UNITED STATES PATENTS

| 3,283,179 | 11/1966 | Carlisle et al. | 307/133 |
| 3,356,784 | 12/1967 | Bertioli et al. | 323/22 SC |
| 3,444,456 | 5/1969 | Codichini | 323/24 X |
| 3,474,325 | 10/1969 | Schaefer | 323/38 X |
| 3,506,852 | 4/1970 | De Hart | 323/22 SC |

*Primary Examiner*—A. D. Pellinen
*Attorney*—Wolfe, Hubbard, Leydig, Voit & Osann, Ltd.

ABSTRACT: A burst length proportioning controller for supplying bursts of integral numbers of half-cycles of AC current to a condition-controlling load in a manner tending to maintain the controlled condition, such as temperature, at a predetermined set point. Whenever energization of the load is required a thyristor-type switch is fired by a firing pulse of predetermined amplitude and in timed synchronism with a zero crossing of the AC voltage, so that positive and unambiguous operation of the switch is assured and the noise and interference generated by its operation are minimized. The determination as to whether energization of the load is required or not is made in a bistable circuit which compares the magnitude of a condition-responsive signal to the magnitude of a cyclical sawtooth reference signal.

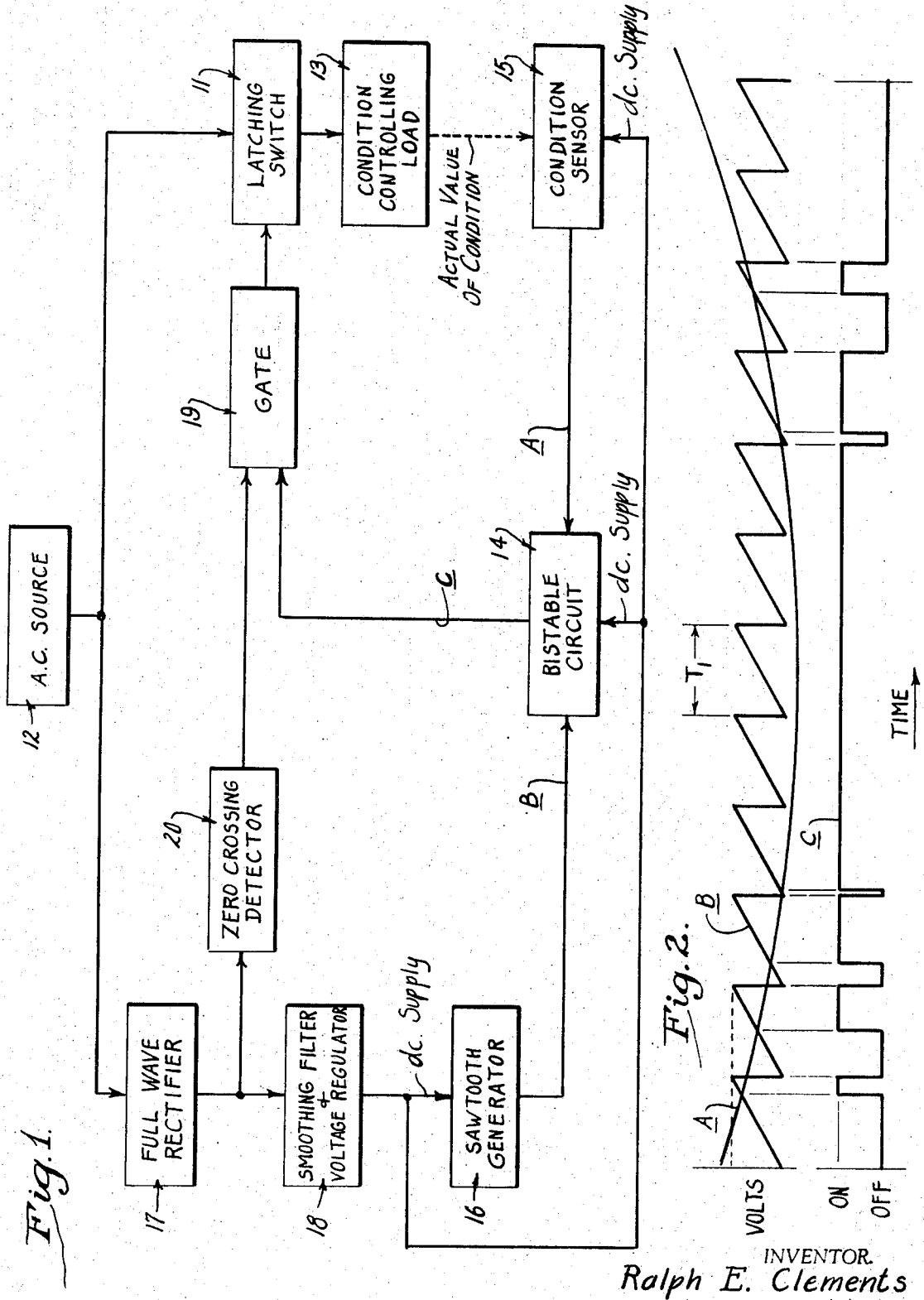

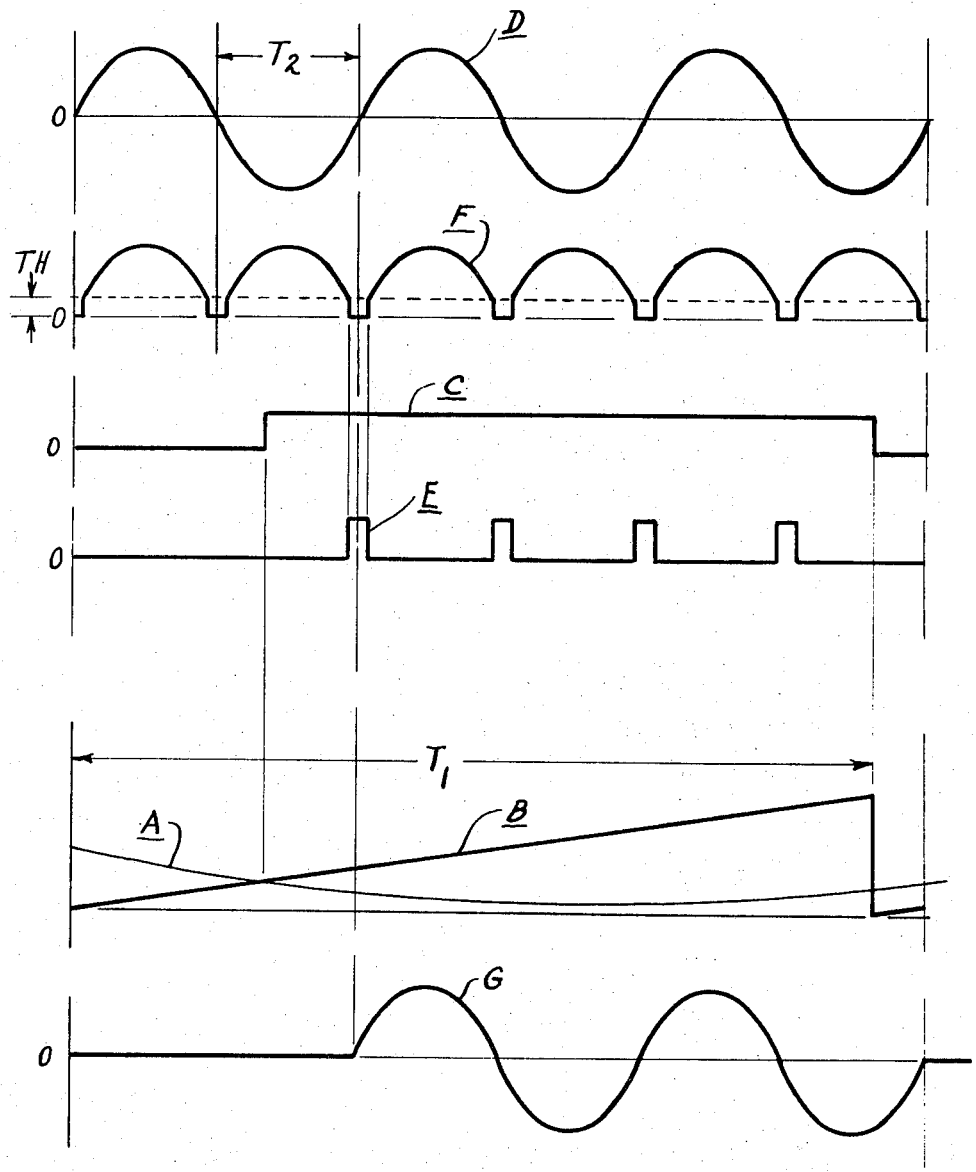

3,633,094

BURST LENGTH PROPORTIONING CONTROLLER

BACKGROUND OF THE INVENTION

The present invention relates to condition controllers, and more particularly to so-called burst length proportioning controllers.

Condition controllers such as here involved are systems for automatically regulating the power supplied to an electrically responsive, condition-controlling load in a manner tending to maintain the controlled condition at a predetermined set point or value. Broadly, such controllers are closed-loop systems that are characterized by a condition monitoring sensor for providing a feedback signal to increase or decrease the power supplied to the load as may be required to return the controlled condition toward its set point. As will be appreciated, such controllers can be used to control a wide variety of parameters, such as temperature, fluid flow, and conveyor speed, to name just a few.

Two general classes of condition controllers are known; viz, on-off and proportioning types. On-off controllers are generally fairly simple and inexpensive, but they cannot provide the close control so often required, particularly for control of industrial process parameters, since they cannot discriminate between different degrees of deviation of the controlled parameter from its set point. Proportioning controllers, on the other hand, can provide close control, since they regulate the power supplied to the condition-controlling load in dependence on and in proportion to the magnitude of the detected deviation. However, the known proportioning controllers are generally expensive and complicated systems, which are frequently bulky and unreliable.

The aforementioned disadvantages of proportioning-type condition controllers have been reduced, though certainly not eliminated, in recent years by the development of burst length proportioning controllers of the type that employ latching switches (particularly thyristors) and zero angle firing techniques therefor to control the current flow from the power source to the load.

As a matter of definition, a "burst length proportioning controller" is a system in which power is supplied to the condition-controlling load in bursts, each of which has a length dependent on the existing deviation of the controlled condition from its set point.

SUMMARY OF THE INVENTION

A general object of the present invention is to provide an improved burst length proportioning-type condition controller which has a positive and unambiguous response to any deviation of the controlled condition from its set point. A more specific related object is to provide a burst length proportioning controller which does not require any internal feedback circuitry or superimposition of signals to properly regulate the lengths of the bursts of current supplied to the condition-controlling load.

Another object of this invention is to provide a burst length proportioning controller of the foregoing type for providing bursts of energizing current to a condition-controlling load, without generating significant amounts of electrical or electromagnetic noise or interference. A specific related object is to provide a burst length proportioning controller of the foregoing type which employs latching-type switches for switching the AC source into and out of energizing relationship with the condition-controlling load and zero-crossing firing techniques for the latching switches.

Finally, it is an object of this invention to provide a burst length proportioning-type condition controller which is relatively reliable, simple, compact and inexpensive, and which may be readily adapted for controlling a wide variety of different types of parameters.

BRIEF DESCRIPTION OF THE DRAWINGS

Other objects and advantages of the present invention will become apparent from the following detailed description, taken in conjunction with the attached drawings, in which:

FIG. 1 is a block diagram of a burst length proportioning controller constructed in accordance with the present invention;

FIG. 2 is a timing chart illustrating exemplary relationships with respect to time of the inputs to and output from the bistable circuit of the burst length proportioning controller shown in FIG. 1;

FIG. 3 is an enlarged timing chart illustrating typical relationships with respect to time of the voltages appearing at various points in the controller of FIG. 1.

DETAILED DESCRIPTION OF THE ILLUSTRATED EMBODIMENT

Figure 4:
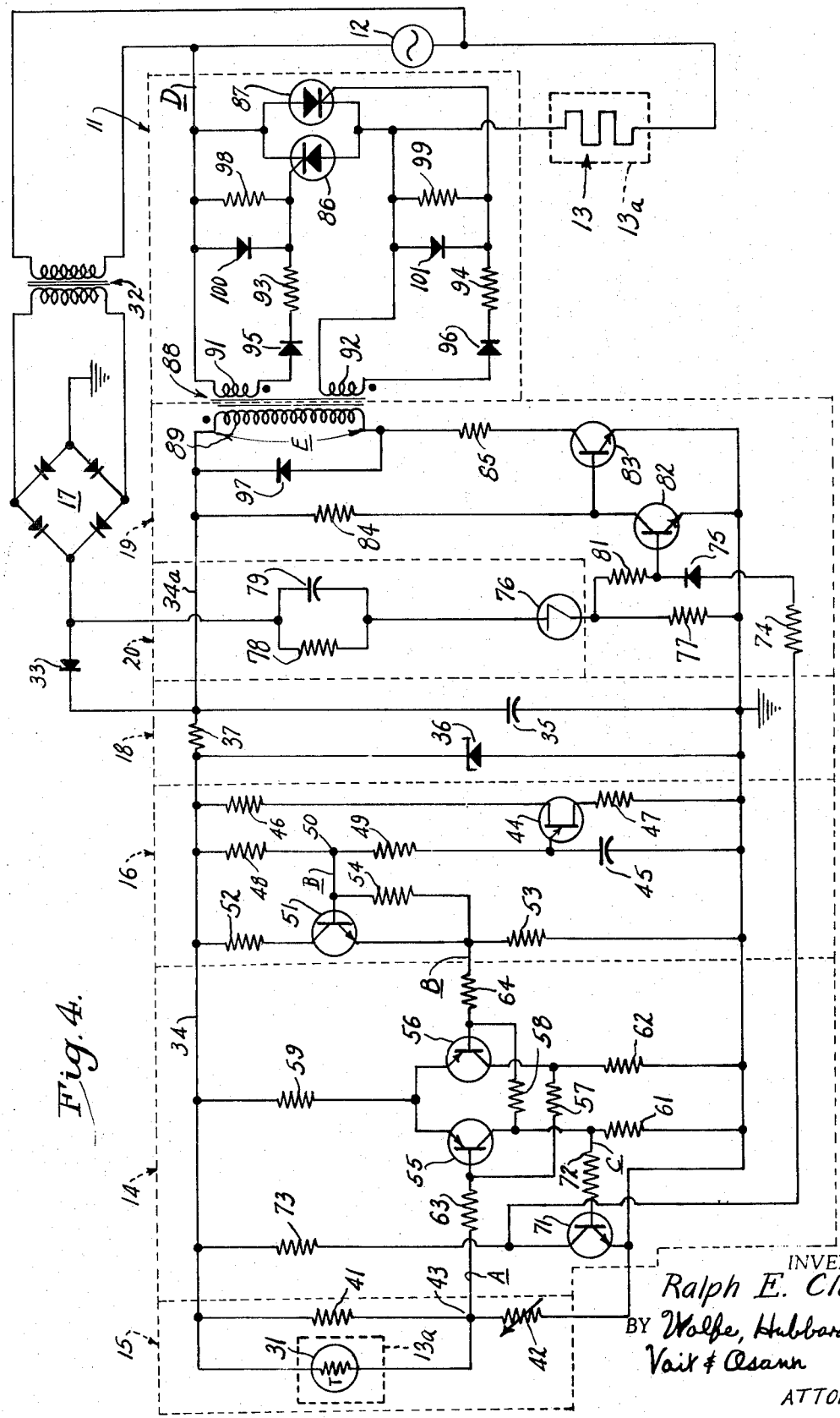
FIG. 4 is an elementary electrical schematic diagram corresponding to the block diagram of FIG. 1 and illustrating an exemplary use of the present invention as a temperature controller.

While the invention will be described hereinafter in connection with a single illustrated embodiment, it is to be understood that the intent is not to limit it to that embodiment. To the contrary, the intent is to cover all alternatives, modifications and equivalents falling within the spirit and scope of the invention as defined by the appended claims.

Turning now to the drawings, and particularly to FIG. 1, the burst length proportioning controller there shown comprises a latching switch 11 which is operated to supply bursts of current from a power source 12, typically an AC voltage source, to a condition-controlling load 13 in a manner tending to maintain the controlled condition at a predetermined set point. To accomplish this, the condition controller continuously and automatically adjusts the lengths of the current bursts and the periods between them in accordance with whatever tendency there is for the controlled condition to deviate from its set point.

Generally, burst length proportioning controllers are employed to regulate the current flow between an AC source and an AC responsive load. For that purpose, the latching switch 11 preferably has a bidirectional current carrying capability. Of course, the AC source 12 may normally be the readily available commercial power lines, with such voltage step-up or stepdown necessary to satisfy any specific voltage requirements of the particular condition controlling load 13.

In keeping with a primary feature of the present invention, the response of the condition controller to any deviation of the controlled condition from its set point calling for energization of the condition-controlling load 13 is positive and unambiguous. Thus, when any such deviation is detected, a substantially constant amplitude control pulse is applied to the control circuit of the latching switch 11 to fire or switch its power circuit from a nonconductive state to a conductive state for series current flow between the source 12 and the load 13. The amplitude of the control pulse is independent of the magnitude of the deviation of the controlled condition from its set point and can, therefore, be selected for optimum switching of the latching switch 11. Thus, the desired positive and unambiguous operation of the latching switch 11 is provided, even in response to only slight deviations of the controlled condition from its set point, without creating the possibility that the latching switch or any of the other circuitry will be overdriven when the deviation is much greater.

To carry out this feature of the invention, advantage is taken of the "on-off" or digital characteristics of a bistable circuit 14. One input of the bistable circuit 14 is supplied by a condition-monitoring sensor 15 with a condition-responsive DC error signal, which varies in amplitude from a predetermined nominal level as a function of any deviations of the controlled condition from its set point, and its other input is supplied by a reference signal source 16 with a DC reference signal which periodically varies in amplitude between predetermined upper and lower limits. The condition-responsive signal and the reference signal are scaled relative to one another, so that the nominal level of the former is somewhere, preferably midway, between the upper and lower limits of the latter. Accordingly, as shown in FIG. 2, the bistable circuit 14 switches between its first and second states (illustrated as its "off" and "on" states, respectively) as the amplitude of the condition-response signal A rises above and drops below, respectively, the amplitude of the reference signal B. The bistable circuit 14, therefore, produces a train of substantially constant amplitude output pulses C, which vary in duration and repetition rate as a function of the magnitude and frequency of any deviations of the controlled condition from its set point.

Ordinarily, the most effective regulation of the energizing current for the condition controlling load 13 is obtained when there is a substantially linear relationship between the duration or length of each current burst and the magnitude of the existing deviation of the controlled condition from its set point. And it is preferable, although not essential, to make the latching switch 11 bidirectional so that most, if not all, of the bursts comprise both positive and negative-going half-cycles of the source current. For these reasons and as shown in FIG. 3 the period $T_1$ of the reference signal B is preferably long relative to the half-cycle period $T_2$ of the AC voltage D supplied by the source 12, and the reference signal B is preferably a substantially linear ramp or sawtoothlike signal, such as may be supplied by a sawtooth generator 16.

Of course, the DC power for the bistable circuit 14, sensor 15 and sawtooth generator 16 generally can be derived from the AC source 12; for example, by a full-wave rectifier 17 and a smoothing filter and voltage regulator 18.

As is apparent from inspection of FIG. 2, the output pulses C of the bistable circuit 14 are randomly distributed with respect to time and, therefore, have no fixed relationship to the zero crossings of the AC current supplied by the source 12. Thus, if the pulses C were applied directly to the control circuit of the latching switch 11, there would be instances in which appreciable discontinuities in the AC load current would occur. Such discontinuities would create high-frequency harmonics and be a major source of electrical and electromagnetic noise and interference—which might cause spurious responses or malfunctions in other control apparatus or in communication equipment located nearby.

Consequently, in keeping with another feature of the present invention, to minimize the noise and interference generated, means are provided for gating the bistable circuit output pulses C in timed synchronism with the zero crossings of the AC current to thereby supply substantially constant amplitude control pulses E for so-called zero-angle firing of the latching switch 11 whenever energization of the load 13 is required. More particularly, a gate circuit 19 has one of its inputs coupled to the output of the bistable circuit 14 and its other input coupled to the output of a zero-crossing detector 20. The gate circuit 19 is enabled only when both of its input conditions are satisfied—viz, when the output from the bistable circuit 14 indicates that energization of the condition-controlling load 13 is required and when the output from the zero-crossing detector 20 indicates that the AC voltage from the source 12 is in a zero-crossing region.

From the foregoing it will be understood that when energization of the condition-controlling load 13 is called for by the presence of an output pulse C from the bistable circuit 14, the gate 19 is enabled each time the AC voltage from the source 12 passes through zero, so that successive substantially constant amplitude control pulses E are supplied to fire the latching switch 11 at the outset of each new half-cycle of source voltage. The holding characteristic of the latching switch 11 assures that substantially a complete half-cycle of current is conducted to the load 13 before the latching switch 11 reverts to its nonconductive state. Accordingly, it will be seen that the energizing current for the load 13 is supplied in bursts of substantially complete half-cycles of source current, and that the number of half-cycles in any given burst depends on the magnitude of the deviation of the condition from the set point.

FIG. 4 illustrates an exemplary circuit for applying the principles of the present invention to the control of the temperature of either a space or a material, referred to herein as the controlled device. For this application of the invention, the condition-controlling load 13 is shown as being a heating element and the sensor 15 is shown as including a thermally responsive element, typically a thermistor 31, both located in a controlled device or furnace 13a.

In the illustrated temperature controller, the AC source 12 is coupled by a transformer 32 to the rectifier 17, which is shown as being a conventional full-wave diode-type bridge rectifier, so that a pulsating DC voltage with a frequency twice that of the AC source is produced. The pulsating DC is applied through an isolating diode 33 to the smoothing filter and voltage regulator 18, and is also applied to the zero-crossing detector 20.

The smoothing filter and voltage regulator 18 is connected between a bus 34 and a point of reference potential, hereinafter generally referred to as ground, to supply a substantially constant DC voltage on the bus 34 for powering the bistable circuit 14, the sensor 15, and the sawtooth reference signal generator 16. As shown, the smoothing filter and voltage regulator 18 comprise a filtering capacitor 35 for removing the ripple components of the pulsating DC voltage and a parallel-connected, reversely poled Zener diode for holding the DC voltage applied to the bus 34 at the desired level. A resistor 37 is connected in series with the Zener diode 36 to limit the current therethrough and to provide a voltage drop according to the current which flows through the Zener diode.

The condition-monitoring sensor 15 may be a relatively simple voltage divider connected between the bus 34 and ground or reference potential. Since the particular controller here shown is adapted to receive a condition-responsive signal A which varies in inverse dependence on the variations in the furnace temperature, and since thermistors having negative temperature coefficients are most commonly employed, a negative temperature coefficient thermistor 31 is shown in FIG. 3 as being connected in parallel with a resistor 41 to form the upper arm of the voltage divider, and a resistor 42 is shown as forming the lower arm. This arrangement provides the desired inversely dependent condition responsive signal A at the voltage divider midpoint 43.

The sawtooth reference signal generator 16 in this embodiment is a relaxation oscillator which includes a unijunction transistor 44 with a timing capacitor 45 connected across its emitter and base-1 circuit. The unijunction transistor 44 has its base-2 and base-1 connected between the power bus 34 and ground by respective bias resistors 46 and 47, so that a predetermined firing potential is established therefor. Also, the capacitor 45 is connected to be charged by current flow through a pair of resistors 48 and 49. Accordingly, during charging of the capacitor 45 the voltage thereacross rises with a substantially linear ramp until it reaches the predetermined firing potential for the unijunction transistor 44. At that point, the capacitor 45 is rapidly discharged through the emitter and base-1 circuit of the unijunction transistor 44. As will be understood, the cycle repeats at a substantially constant frequency which is primarily determined by the charging time constant for the capacitor 45, so that the desired periodic sawtoothlike reference signal B appears at the junction 50 between the resistors 48 and 49.

The unijunction transistor 44 is preferably isolated from the balance of the circuitry, such as by a buffer amplifier. Accordingly, the reference signal B is applied to the base of a transistor 51, which is connected in emitter follower configuration, with its collector connected through a dropping resistor 52 to the power bus 34 and its emitter connected through a load resistor 53 to ground. A bias resistor 54 is connected between the base and emitter of the transistor 51 to enhance its linearity and thereby assure that the reference wave B is faithfully reproduced across the emitter load resistor 53.

The bistable circuit 14 as here shown is a direct coupled flip-flop formed by a pair of transistors 55 and 56, each of which has its base connected to the collector of the other by a respective cross-coupling resistor 57 and 58, its emitter coupled to the power bus 34 via a common or shared bias resistor 59, and its collector returned to ground through a respective load resistor 61 and 62.

The condition-responsive signal A at the voltage divider midpoint 43 is applied through a current limiting resistor 63 to the base of the transistor 55, and the reference signal B appearing across the resistor 53 is applied through a current limiting resistor 64 to the base of the transistor 56, so that conventional flip-flop-type action is obtained as first one and then the other of the two signals has the greater amplitude. For example, if the sensed temperature drops below its set point to cause a corresponding drop of the condition-responsive signal A to a level below that of the reference signal B, the transistor 55 is then biased for increased conduction, thereby causing an increased voltage drop to be developed across its load resistor 61. This, in turn, is reflected by the cross-coupling resistor 58 to the base of the transistor 56 to reduce the conduction thereof and, therefore, the voltage developed across its load resistor 62. This reduced voltage drop is, in turn, reflected through the cross-coupling resistor 57 to the base of the transistor 55 to further increase its conduction. Of course, this action is regenerative and cumulative, so that the transistor 55 is quickly biased to a state of saturated conduction and the transistor 56 is turned off. On the other hand, when the amplitude of the reference signal B exceeds that of the condition-responsive signal A, just the opposite response is obtained, i.e., the transistor 55 is biased out of conduction while the transistor 56 is biased to a state of saturated conduction. Thus, it will be understood that the voltage across the load resistor 61 constitutes the waveform C.

The illustrated gate circuit 19 is a NOR gate which has one input coupled to the bistable circuit 14 and its other input coupled to the zero-crossing detector 20. As previously mentioned, to supply the desired control pulses E for the latching switch 11, the NOR gate is enabled only when energization of the heating element 13 is required and the AC source voltage is in a zero-crossing region. Under all other conditions, the NOR-gate 19 is inhibited.

More particularly, to inhibit the NOR-gate 19 when energization of the heating element 13 is not required, an inverter formed by a transistor 71 is responsive to the pulses C from the bistable circuit 14. The base of transistor 71 is connected through a current-limiting resistor 72 to the collector of the transistor 55, its collector is connected by a load resistor 73 to the power bus 34, and its emitter returned to ground. With this arrangement, the transistor 71 is switched into and out of conduction in response to the presence and absence, respectively, of an output pulse C from the bistable circuit 14. Accordingly, by connecting the first input of the NOR-gate 19 to the collector of the transistor 71, the current flow through the load resistor 73 provides a voltage which is the complement of the pulses C, and which forms an inhibiting signal for the NOR-gate 19 whenever energization of the heating element 13 is not required. Suitably, this inhibiting signal is conducted through a current-limiting resistor 74 and a blocking diode 75.

On the other hand, to inhibit the NOR-gate 19 when the AC source current is outside a zero-crossing region, the illustrated zero-crossing detector 20 comprises a breakdown diode 76 which has its anode connected to the output of the bridge rectifier 17 and its cathode connected through a dropping resistor 77 to ground. Further, to eliminate any phase difference between the pulsating DC potential supplied by the bridge rectifier 17 and the AC voltage supplied by the source 12, a phase-compensating network, such as the parallel resistor 78 and capacitor 79 shown, may be connected in series with the diode 76. The breakdown potential for the diode 76 is selected so that the diode conducts whenever the pulsating DC potential supplied by the rectifier 17 exceeds a predetermined threshold potential TH, so that the voltage drop across the resistor 77 has the form shown at F in FIG. 3 and is zero only substantially when the source voltage D is passing through zero. The second input for the NOR-gate 19 is connected to the junction between the breakdown diode 76 and the resistor 77, so that a second inhibiting signal F is supplied to the NOR gate whenever the diode 76 is conducting, i.e., whenever the AC voltage from the source 12 is outside the zero-crossing region defined by the diode threshold TH. Typically, this inhibiting signal is applied to the NOR gate through a current-limiting resistor 81. The blocking diode 75 is poled to prevent the inhibiting signal supplied by the zero-crossing detector 20 from being attenuated in the bistable circuit 14.

The NOR-gate 19 comprises a pair of cascade connected transistors 82 and 83 having their collectors respectively connected through resistors 84 and 85 to a positive voltage supply line 34a and their emitters returned to ground or reference potential. The inputs of the NOR-gate 19 are connected to the base of the transistor 82, so that if an inhibiting signal is present at either or both of them, there is base-emitter bias current to hold the transistor 82 in a conductive state which, in turn, holds the transistor 83 in a nonconductive state. However, in the absence of such an inhibiting signal from either the bistable circuit 14 or the zero-crossing detector 20, the transistor 82 switches to a nonconductive state to, in turn, switch the transistor 83 to a state of saturated conduction. It will, therefore, be appreciated that when energization of the heating element 13 is required, the NOR-gate 19 is periodically enabled in synchronism with the "on" periods of the bistable circuit but only during the zero-crossing regions of the AC source voltage to thereby supply the desired substantially constant amplitude control pulses E to fire the latching switch 11.

In the illustrated embodiment, the latching switch 11 comprises a pair of silicon-controlled rectifiers (SCR's) 86 and 87, which have their anode-cathode power circuits oppositely poled and connected in parallel for bidirectional current flow between the AC power source 12 and the heating element 13. It is to be understood, however, that other latching switches might be used, for example, other static, thyristor-type latching switches, such as the gate-controlled, full-wave, AC silicon switch known as a "Triac."

As here shown, the control pulses E are coupled from the NOR-gate 19 to the latching switch 11 by a transformer 88 which has its primary winding 89 connected in series in the collector circuit of the transistor 83 and a pair of secondary windings 91 and 92, each connected by a current-limiting resistor 93, 94 and a reverse-current-blocking diode 95, 96 across the gate-cathode control circuit of a respective one of the SCR's 86 and 87. In keeping with accepted practices, a diode 97 may be connected across the primary winding 89 to provide a low-impedance discharge for the energy which produces a reverse voltage when current through the winding is suddenly terminated. Also, a respective resistor 98 and 99 may be connected across the gate-cathode junctions of each of the SCR's 86 and 87 to provide a path for reset current, and each of the junctions may be protected by a respective reverse voltage clamping diode 100, 101 connected in parallel therewith.

The windings of the transformer 88 are wound as indicated by the dot notation, so that any control pulse E appearing across the primary winding 89 induces in each of the secondary windings 91 and 92 a corresponding pulse which is of proper polarity to fire the respective associated SCR's 86 and 87. It will be seen that, due to the opposite poling of their anode-cathode circuits, the SCR's 86 and 87 conduct during alternate half-cycles of the AC voltage supplied by the source 12 to the heating element 13, with the number of half-cycles in each such burst being determined by the deviation of the controlled temperature from its set point. Moreover, it will be understood that the SCR's 86 and 87 each conduct, if fired at all, during substantially complete half-cycles of the source voltage, since when either of them is switched to its conductive state at the outset of a half-cycle, it reverts to its nonconductive state only when the current from the source 12 drops below the holding current level. For the case represented by FIG. 3, one "burst" of current is shown at G. Of course, the AC source current does not drop below the relatively low-holding current level for the conducting SCR until the half-cycle is substantially completed.

The "set point" temperature is established by the value of the resistor 42 in the condition sensor 15, such that the condition-representing voltage A has a nominal value substantially midway between the upper and lower peak values of the sawtooth voltage B when the actual temperature equals the desired set point value. Thus, at equilibrium or zero temperature error, bursts of current lasting about one-half of the period of the sawtooth waveform B are supplied to the heating element 13 to supply heat energy at an average rate which just makes up for normal losses from the furnace 13a. If the furnace temperature should rise above the set point, the bursts of current become progressively shorter and, indeed may be terminated, to reduce the rate of heat injection into the furnace so that the latter cools back down to the set point temperature. On the other hand, if the furnace temperature should fall below the set point, the bursts of current become progressively longer, and indeed may cause the SCR's 86 and 87 to conduct without interruption, to increase the rate of heat injection so that furnace temperature increases back toward and to the set point value.

From the foregoing, it will be appreciated that the burst length proportioning controller of the present invention is relatively simple, but nevertheless highly reliable. Also, it will be understood that the controller is readily adaptable to the control of a wide variety of different conditions. Finally, it will be seen that the operation of the controller creates little, if any, electrical or electromagnetic noise or interference due to the fact that if conduction occurs during any given half-cycle of the source voltage, it begins substantially at the instant that the half-cycle starts. No abrupt "step changes" in the anode-cathode current of the SCR's occurs, so that harmonics and "-noise" are largely eliminated.

I claim as my invention:

1. A burst length proportioning controller for regulating the current flow from a voltage source to a condition-controlling load in a manner tending to maintain a condition controlled at a predetermined set point, said condition controller comprising the combination of a sensing means for producing a condition-responsive DC signal which varies in magnitude from a nominal level substantially solely as a function of any deviation of said condition from its set point, reference means for supplying a reference signal which cyclically varies in magnitude between upper and lower values independently of said condition-responsive signal, a regenerative bistable circuit means which has one input coupled to receive said condition-responsive signal and another input coupled to receive said reference signal to supply an output signal when the magnitude of a predetermined one of said signals exceeds the magnitude of the other of said signals, and a switch means connected between said source and said load and coupled to said bistable circuit means for operation in response to said output signal to complete a circuit for current flow between said source and said load, whereby said load is then energized to return said condition to its set point.

2. The burst length proportioning controller of claim 1 wherein said source is an AC voltage source of predetermined frequency, and said switch means is a latching type; and further including means coupled between said bistable circuit means and said switch means and responsive to the amplitude of the voltage supplied by said source for gating output signals from said bistable circuit means to said switch means in timed synchronism with the zero crossings of the current from said source to thereby minimize the noise and interference generated by the operation of said switch means.

3. The burst length proportioning controller of claim 1 wherein said reference means is a sawtooth-generating means which supplies a sawtooth reference signal that cyclically varies in magnitude between predetermined upper and lower values which are respectively above and below the nominal level of said condition responsive signal.

4. The burst length proportioning controller of claim 3 wherein said source is an AC voltage source of predetermined frequency and said switch means is a bidirectional latching-type switch; and further including a gate means coupled between said bistable circuit means and said switch means, and a zero-crossing detector means coupled between said AC source and said gate means for inhibiting said gate means whenever the current supplied by said source is outside a zero-crossing region, whereby said switch means is operated only when there is an output signal from said bistable circuit means at the same time as the voltage of said source is in a zero-crossing region and is then effective to supply a substantially complete half-cycle of said current to energize said load.

5. The burst length proportioning controller of claim 4 further including a full-wave rectifying means coupled to said AC source for supplying a pulsating DC potential with a ripple frequency twice the frequency of the AC voltage supplied by said source; and wherein said zero-crossing detector means comprises a breakdown diode having a predetermined breakdown threshold and a dropping resistor connected between said rectifying means and a point of reference potential, and said gate means has one input coupled to said bistable circuit means, another input coupled to a junction between said diode and said dropping resistor, and an output coupled to said switch means, said gate means being enabled when there is an output signal from said bistable circuit means and said DC potential is below the breakdown potential of said diode and then being effective to supply an output pulse of predetermined amplitude for triggering said switch means.

6. The burst length proportioning controller of claim 1 wherein said source is an AC voltage source of predetermined frequency, said switch means comprises a pair of controlled rectifiers with respective anode-cathode power circuits oppositely poled and connected in parallel between said AC source and said load and having respective gate-cathode firing circuits; and further including a full-wave rectifier means coupled to said AC source for supplying a pulsating DC potential with a frequency twice that of said AC current, a NOR gate means with an output coupled to the gate-cathode firing circuits of said controlled rectifiers, signal-inverting means coupled between said bistable means and a first input to said NOR gate means for applying a first inhibiting signal thereto in the absence of an output signal from said bistable circuit means, and a zero-crossing detector means coupled between said rectifier means and a second input to said NOR gate means for applying a second inhibiting signal thereto when said AC voltage is outside a zero-crossing region, whereby a firing pulse for said controlled rectifiers is produced only when there is an output signal from said bistable circuit means concurrently with the passage of said AC voltage through a zero-crossing region.

7. The burst length proportioning controller of claim 6 wherein said reference means is a sawtooth generator producing a sawtooth reference signal having a frequency which is substantially less than said predetermined frequency.

8. In a burst length proportioning controller for use with an AC voltage source, the combinatioN comprising a regenerative bistable circuit means having first and second inputs and means for producing an output signal having first and second logic levels respectively representative of the amplitude of the signal applied to said first input exceeding and being exceeded by the amplitude of the signal applied to said second input, means for applying to said one input a DC signal which varies in amplitude from a nominal level substantially solely as a function of deviations in a controlled condition from a predetermined set point, means for applying to the other of said inputs a repetitive sawtooth reference signal which independently varies between upper and lower limits above and below said nominal level whereby the duration of said output signal at said first and second logic levels varies as a function of the deviations of said controlled condition from its set point, detector means for sensing zero crossings of the AC voltage supplied by said source, and gate means coupled to said bistable means and to said detector means for providing a trigger pulse only when a zero crossing of said AC signal is detected coincidentally with said output signal being at a preselected one of said logic levels.

9. The combination of claim 8 wherein said output signal is at relatively high and low-logic levels when the amplitude of said DC signal respectively exceeds and is exceeded by the amplitude of said reference signal, said gate means comprises a NOR gate having one input coupled to said detector means and another input coupled to said bistable means, said detector means includes means for applying an inhibiting signal to said gate whenever said AC signal is outside a zero-crossing region, and further including an inverting means between the bistable means and said gate whereby another inhibiting signal is applied to said gate whenever said output signal is at a high-logic level.

* * * * *